United States Patent [19]

Van Winkle

[11] 4,003,139

[45] Jan. 18, 1977

[54] GRAIN DRYER

[76] Inventor: Clinton T. Van Winkle, Cairo, Nebr. 68824

[22] Filed: May 6, 1975

[21] Appl. No.: 567,726

[52] U.S. Cl. .................................. 34/86; 34/174
[51] Int. Cl.² ...................................... F26B 19/00
[58] Field of Search ............... 34/31, 35, 86, 171, 34/174, 175, 176, 65, 64; 432/63

[56] References Cited

UNITED STATES PATENTS

| 1,658,775 | 2/1928 | Campbell | 34/86 |
| 2,200,379 | 5/1940 | Williams | 34/86 |
| 2,410,851 | 11/1946 | Welty | 34/174 |
| 2,437,899 | 3/1948 | Welty | 34/86 |
| 2,562,405 | 7/1951 | Altman | 34/35 |
| 2,706,345 | 4/1955 | Arndt | 34/65 |
| 2,777,212 | 1/1957 | McOmber | 34/86 |

FOREIGN PATENTS OR APPLICATIONS 784,861   10/1957   United Kingdom ............. 34/174

Primary Examiner—Kenneth W. Sprague
Assistant Examiner—James C. Yeung
Attorney, Agent, or Firm—Zarley, McKee, Thomte & Voorhees

[57] ABSTRACT

A portable grain dryer is disclosed which is adapted to be used by itself to dry grain or which may be used on a combine or the like to aid in drying grain. An air cooled engine is provided within an elongated shroud-like housing adjacent one end thereof. The exhaust from the air cooled engine passes into an exhaust pipe which extends downwardly along the length of the housing and thence outwardly to the atmosphere. A fan means is operatively connected to the air cooled engine for drawing air over the engine and over the exhaust pipe and for forcing the same into a grain tank or the like. If the device is used on a combine, the combine engine exhaust is also piped through the housing to further heat the air passing through the housing into the grain tank. Preferably, an air deflector or defuser is provided in the lower end of the grain tank for directing the air upwardly through the grain to aid in drying the same.

1 Claim, 5 Drawing Figures

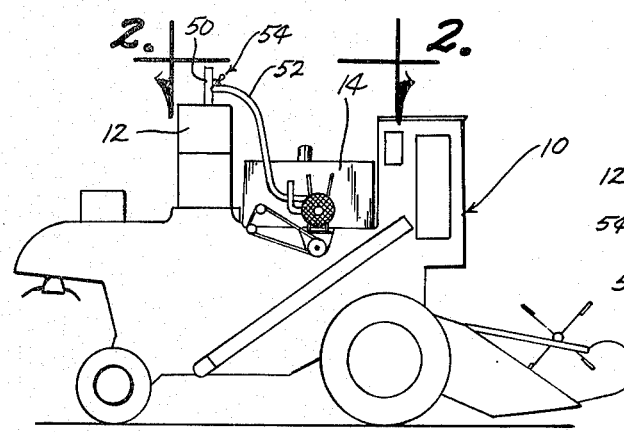
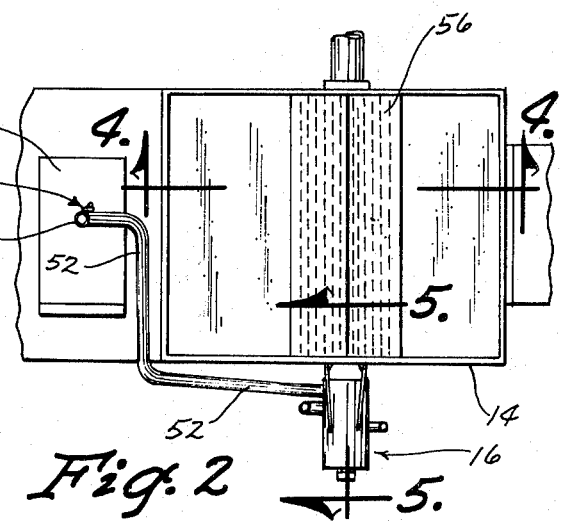
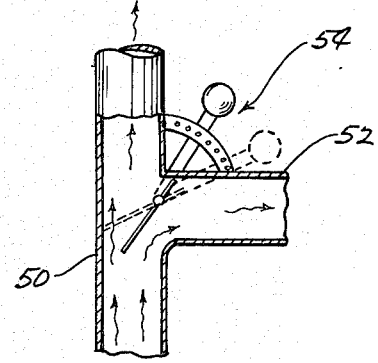
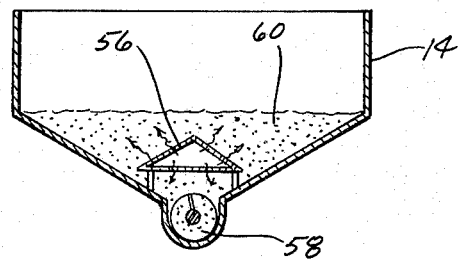
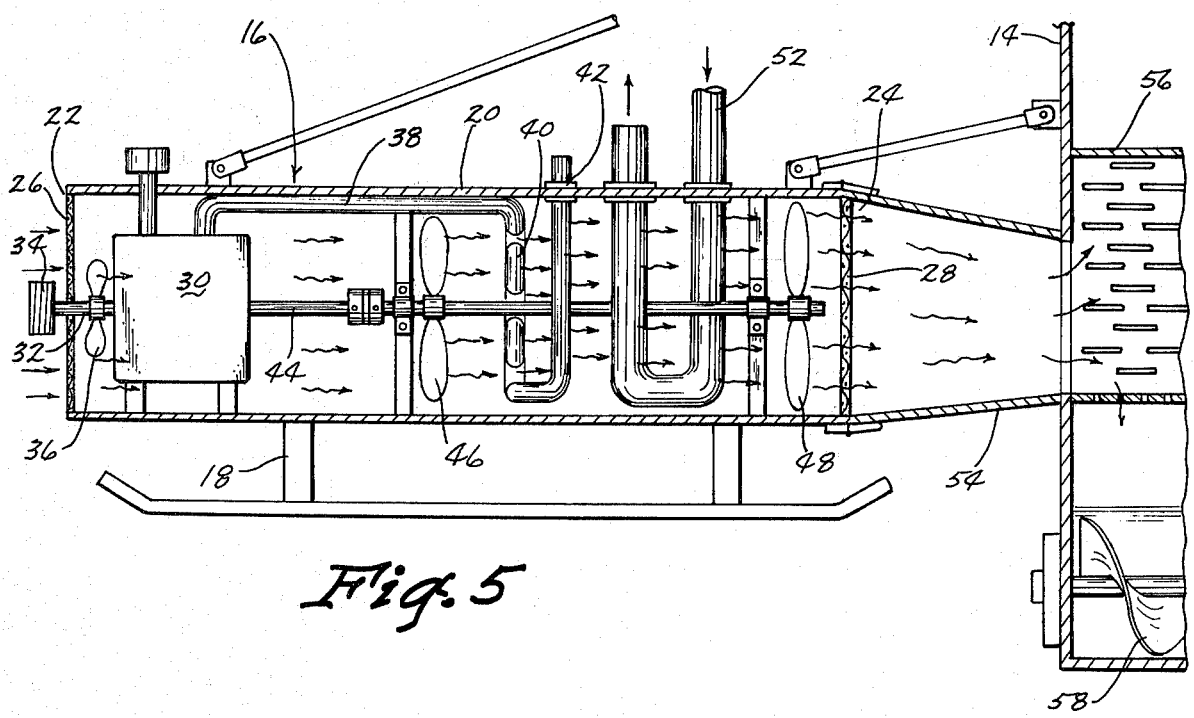

GRAIN DRYER

BACKGROUND OF THE INVENTION

The invention relates to a grain dryer and more particularly to a portable grain dryer which may be used in combination with a combine to aid in drying the grain being harvested thereby.

Frequently, it is necessary to dry grain to remove excess moisture therefrom prior to the grain being stored. The conventional method of drying the grain is to first harvest the grain and then transport the grain to a large gas fired drying apparatus. The gas fired dryers ordinarily employ propane or the like to heat air which is then forced through the grain to remove the moisture therefrom. The scarcity of fuel and the high cost thereof adversely affect the heretofore conventional means of drying grain.

Therefore, it is a principal object of the invention to provide a portable grain dryer which may be used by itself or which may be used in combination with a combine or the like.

A further object of the invention is to provide a grain dryer which utilizes the heat produced by an air cooled engine and the exhaust therefrom for drying grain.

A still further object of the invention is to provide a grain dryer which utilizes the heat from an air cooled engine and the combine exhaust so as to supply heated air to the interior of the grain tank to dry the grain.

A further object of the invention is to provide a grain dryer which dries grain in a much more economical fashion than heretofore possible.

A still further object of the invention is to provide a portable grain dryer which is economical of manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a side view of a combine having the grain dryer of this invention mounted thereon:

FIG. 2 is a partial enlarged sectional view seen on lines 2 — 2 of FIG. 1:

FIG. 3 is a partial sectional view of the means for directing the combine engine exhaust to the dryer:

FIG. 4 is an enlarged sectional view seen on lines 4 — 4 of FIG. 2; and

FIG. 5 is a sectional view seen on lines 5 — 5 of FIG. 2.

DESCRIPTION OF THE PREFERRED EMBODIMENT

The numeral 10 refers generally to a conventional grain combine including an engine 12 and a grain tank 14. The grain dryer of this invention is referred to generally by the reference numeral 16 and may be used by itself to dry grain or it may be mounted on the combine 10 to dry grain as the grain is being harvested. The preferable method of employing the grain dryer 16 is to mount it on the combine 10. Dryer 16 generally comprises a frame means 18 having an elongated shroud-like housing 20 secured thereto having an intake end 22 and a discharge end 24. A screen 26 is secured to the housing 20 at the intake end 22 to prevent chaff or the like from entering the interior of the housing. Likewise, a screen 28 is provided at the discharge end 24 of the housing 20.

An air cooled engine 30 is mounted within the housing 20 adjacent the intake end 22 as illustrated in FIG. 5. Shaft 32 extends from the engine 30 outwardly through the screen 26 and has a starter mechanism 34 provided on the outer end thereof. The numeral 36 refers generally to a fan means mounted on the shaft 32 for rotation therewith. If desired, an intake hood or the like could be provided at the intake end 22 to aid in directing the air inwardly of the interior of the housing 20. An exhaust pipe 38 extends from the engine 30 through the interior of the housing 20 and is provided with several convolutions 40 as illustrated in FIG. 5 before it exits through the discharge opening 20 at 42. Shaft 44 extends from the engine 30 and has fans 46 and 48 mounted thereon which are adapted to rotate therewith. The combine engine exhaust is normally discharged by means of exhaust pipe 50. If the dryer 16 is being used in combination with the combine, the exhaust pipe 50 is modified so as to include a laterally extending exhaust pipe portion 52 having a manual operated valve means 54 so that the exhaust coming from the engine 12 may be supplied to the exhaust pipe portion 52 as illustrated in FIG. 3. Exhaust pipe portion 52 extends downwardly into the interior of housing 20 as illustrated in FIG. 5 and then passes upwardly therefrom to the atmosphere.

The conduit 54 connects the discharge end 24 of the housing 20 to a perforated deflector or defuser 56 provided in the lower end of the grain tank 14 as illustrated in FIG. 4. The defuser 56 is triangular in section and is adapted to deflect the air in the directions illustrated by arrows in FIG. 4 so that the air will pass upwardly through the grain as will be described in more detail hereinafter. In FIGS. 4 and 5, the numeral 58 refers to an unloading auger.

In operation, the combine would be operated in conventional fashion so as to harvest the grain. The valve means 54 would be operated so that the exhaust from the engine 12 is directed into the exhaust pipe portion 52 through the interior of the housing 20 and thence outwardly to the atmosphere. Engine 30 would be operated so that the fans 36, 46 and 48 would cause air to flow through the housing 20 as illustrated by the arrows in FIG. 5. Thus, the air passing through the housing 20 is heated by the engine 30 as it passes thereover and is heated by coming into contact with the exhaust pipe 38 and the exhaust pipe portion 52. The heated air is forced into the lower end of the grain tank 14 by means of the defuser 56 so that the heated air passes upwardly through the grain 60 within the tank. When the grain tank is full, the unloading auger 58 is utilized to discharge the same therefrom.

Thus it can be seen that a novel grain dryer has been provided which permits the grain being harvested to be dried to a certain extend as the grain is being harvested. The grain dryer permits the removal of excess moisture from the grain in an extremely economical manner since the air cooled engine 30 requires very little fuel to operate. The grain dryer of this invention also utilizes the heat produced by the exhaust from the combine engine 12 which would otherwise be lost to the atmosphere. If the dryer 16 is used by itself to heat grain, the exhaust pipe portion 52 would not be utilized. The engine 30 would be operated so as to produce heat which would be supplied to the lower end of a suitable grain container or the like.

If this dryer is to be built into a combine as a permanent fixture, the small engine 30 can be removed and a pulley with belt can be used to drive the fans 46 and 48 from the combine engine. The heat from the combine engine can be used to dry the grain and the heat can be controlled by the valve 54 in FIG. 3. The preferred embodiment is that which has been previously described but it should be noted that a certain amount of drying can be achieved through utilization of the heat generated from the combine engine exhaust pipe only.

Thus it can be seen that the invention accomplishes at least all of its stated objectives.

I claim:

1. In combination with a combine having a first engine and a grain tank, comprising, a portable grain dryer mounted on said combine, said grain dryer comprising a housing having first and second ends, an air cooled engine mounted in said housing inwardly of said first end, said air cooled engine having an exhaust pipe extending therefrom through said housing and thence outwardly to the atmosphere, a fan means rotatably mounted in said housing and being driven by said air cooled engine whereby said fan means will draw air inwardly into said housing first end and force air outwardly from said housing second end, said second end of said housing being in operative communication with the lower interior of the grain tank whereby the air passing through said housing will be heated by the heat from said air cooled engine and said exhaust pipe and will be forced into the lower interior of the grain tank by said fan means, and an exhaust pipe portion extending from said first engine through said housing so that the heat from said exhaust pipe portion will further heat the air passing through said housing.

* * * * *